(12) United States Patent
Banerjee et al.

(10) Patent No.: US 8,911,514 B2
(45) Date of Patent: Dec. 16, 2014

(54) HYDROTREATING METHODS AND HYDROTREATING SYSTEMS

(75) Inventors: Soumendra M. Banerjee, Dwarka (IN); Richard K. Hoehn, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 421 days.

(21) Appl. No.: 13/327,516

(22) Filed: Dec. 15, 2011

(65) Prior Publication Data
US 2013/0152459 A1    Jun. 20, 2013

(51) Int. Cl.
    *C10L 1/18*    (2006.01)

(52) U.S. Cl.
    USPC .............................. 44/308; 585/240; 208/46

(58) Field of Classification Search
    CPC ............ C10G 3/42; C10G 3/50; C10G 45/02;
        C10G 49/002; C10G 65/04; C10G 2400/04;
        C10G 2400/1055; C10G 2400/4006; C10L
        1/026; C10L 1/08
    USPC .............................. 44/308; 585/240; 208/46
    See application file for complete search history.

(56) References Cited

U.S. PATENT DOCUMENTS

| | | | |
|---|---|---|---|
| 2006/0186020 A1* | 8/2006 | Gomes | ............................ 208/46 |
| 2007/0175795 A1 | 8/2007 | Yao et al. | |
| 2010/0076238 A1 | 3/2010 | Brandvold et al. | |
| 2010/0083563 A1 | 4/2010 | Miller | |
| 2010/0160698 A1 | 6/2010 | Perego et al. | |
| 2010/0176026 A1 | 7/2010 | Cole et al. | |
| 2010/0242349 A1 | 9/2010 | Abe et al. | |
| 2011/0047862 A1 | 3/2011 | Mayeur et al. | |
| 2011/0105812 A1 | 5/2011 | Marker et al. | |
| 2011/0155636 A1 | 6/2011 | Hanks et al. | |

FOREIGN PATENT DOCUMENTS

| | | |
|---|---|---|
| EP | 1693432 B1 | 9/2009 |
| WO | 2010049075 A2 | 6/2010 |

OTHER PUBLICATIONS

Bezergianni, S., et al, "Hydrocracking of vacuum gas oil-vegetable oil mixtures for biofuels production," Bioresource Technology, vol. 100, No. 12, p. 3036-3042; Jun. 2009.

Stumborg, M., et al., "Catalytic conversion of vegetable oils to diesel additives," IGT 16th Annual "Energy from Biomass and Wastes" Conference (Orlando, FL Mar. 2-6, 1992) [Proceedings] 721-38; 1993.

Aatola, H., et al., "Hydrotreated vegetable Oil (HVO) as a renewable diesel fuel: Trade-off between NOx, particulate emission, and fuel consumption of a heavy duty engine," SAE International Journal of Engines, vol. 1, No. 1, p. 1251-1262; Apr. 2009.

(Continued)

*Primary Examiner* — Cephia D Toomer
(74) *Attorney, Agent, or Firm* — Maryann Maas

(57) ABSTRACT

Hydrotreating methods and hydrotreating systems are provided herein. In an embodiment, a hydrotreating method includes heating a petroleum-based diesel feed. The heated petroleum-based diesel feed is introduced to a hydrotreating process. An unheated carbonaceous feed is introduced to the hydrotreating process separate from the heated petroleum-based diesel feed. The heated petroleum-based diesel feed and the unheated carbonaceous feed are co-processed in the hydrotreating process. In an embodiment of a hydrotreating system, the hydrotreating system includes a hydrotreating unit, and a heating apparatus, with the heating apparatus heating petroleum-based diesel feed prior to introduction to the hydrotreating unit. The unheated carbonaceous feed source is in fluid communication with the hydrotreating unit for introducing an unheated carbonaceous feed to the hydrotreating unit separate from the petroleum-based diesel feed.

7 Claims, 1 Drawing Sheet

(56) References Cited

OTHER PUBLICATIONS

Huber, G.W., et al., "Processing biomass in conventional oil refineries: Production of high quality diesel by hydrotreating vegetable oils in heavy vacuum oil mixtures," Applied Catalysis A: General, vol. 329, p. 120-129; Oct. 1, 2007.

Pennwell Publishing Co., "Processing—Quick takes: Petrobras to produce soy oil, diesel mix," Oil and Gas Journal, vol. 104, No. 23, p. 10; Jun. 19, 2006.

Sebos, I., et al., "Catalytic hydroprocessing of cottonseed oil in petroleum diesel mixtures for production of renewable diesel," Fuel, vol. 88, No. 1, p. 145-149; Jan. 2009.

* cited by examiner

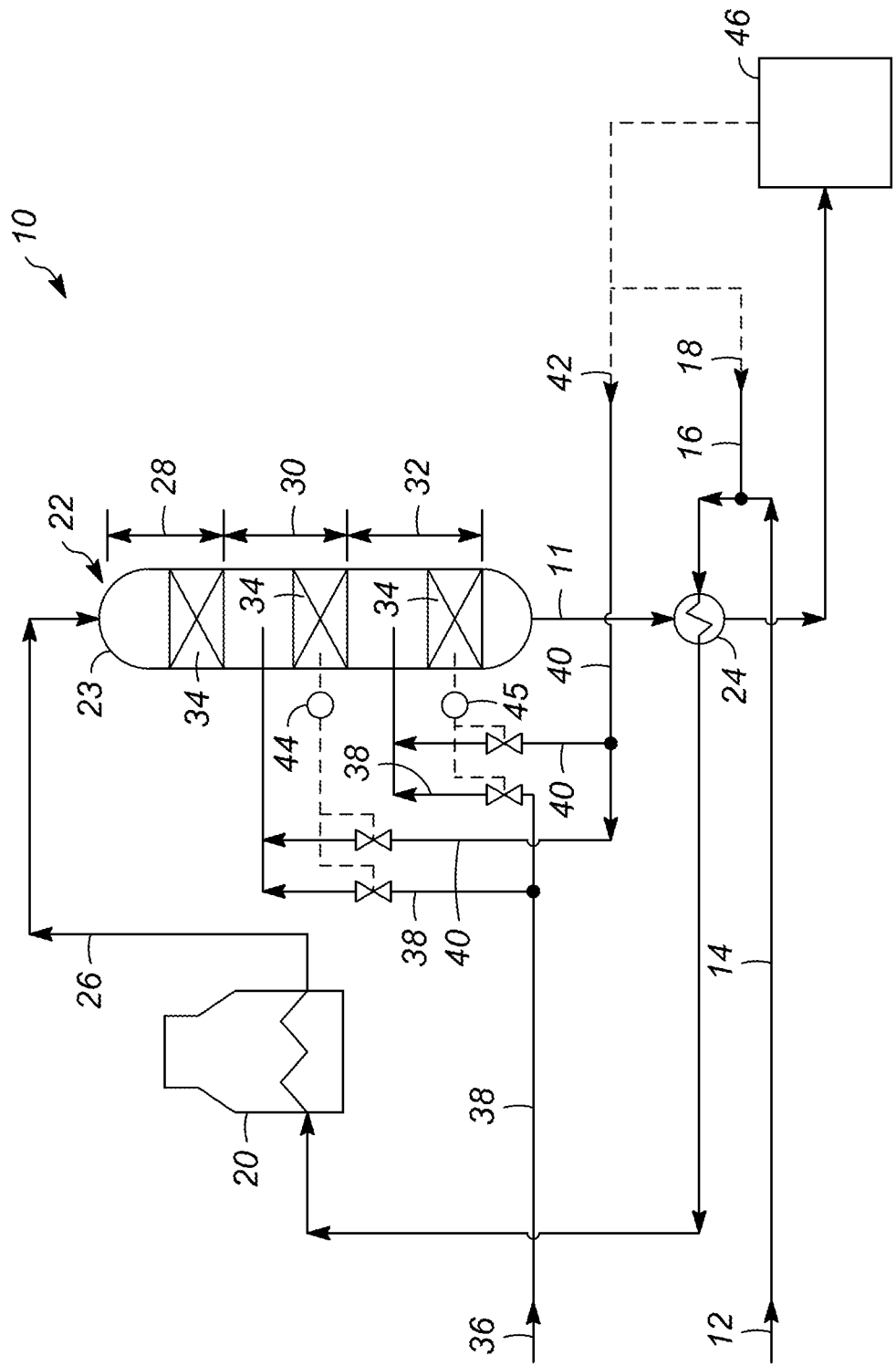

HYDROTREATING METHODS AND HYDROTREATING SYSTEMS

FIELD OF THE INVENTION

The present invention generally relates to hydrotreating methods and hydrotreating systems, and more particularly relates to hydrotreating methods and hydrotreating systems for co-processing a petroleum-based diesel and a carbonaceous feed.

DESCRIPTION OF THE RELATED ART

The emphasis on alternative and sustainable sources of energy has increased in recent years as the demand for gasoline, diesel fuel, and aviation fuel increases worldwide, spurred by concern over depletion of petroleum resources and global warming from carbon dioxide emissions stemming from burning of petroleum-based fuels. One such alternative and sustainable source is what has been termed renewable or biofuel feeds. Examples of biofuel feeds include, but are not limited to, plant oils such as corn, rapeseed, canola, soybean, and algal oils; animal fats such as inedible tallow; fish oils; and various waste streams such as yellow and brown greases and sewage sludge. The common feature of these biofuel feeds is that they are composed of glycerides and free fatty acids (FFA). Both of these compounds contain aliphatic carbon chains having from about 8 to about 24 carbon atoms. The aliphatic carbon chains in the triglycerides or FFAs can also be mono-, di- or poly-unsaturated. Some of the glycerides from the renewable sources may be monoglycerides or diglycerides instead of or in addition to the triglycerides.

The properties of the biofuel feeds that are composed of glycerides and FFAs make them unsuitable for direct replacement or supplementation of petroleum-based diesel fuel in vehicle engines. For example, such biofuel feeds have poor cold-flow properties (e.g., cloud point and cold filter plugging point). However, such biofuel feeds can be processed into hydrocarbon products in the diesel boiling point range for direct replacement or supplementation of petroleum-based diesel fuel in vehicle engines.

It is generally known that hydrocarbon products in the diesel boiling point range can be produced by processes that include hydrotreating the biofuel feed that is composed of glycerides and triglycerides in a hydrotreating unit. For example, it is generally known that biofuel feed that is composed of glycerides and triglycerides can be independently processed in a hydrotreating unit to produce the hydrocarbon products in the diesel boiling range. The resulting hydrocarbon products can then be mixed with petroleum-based diesel fuel. However, such independent processing of the biofuel feed requires separate process streams and equipment, thus dramatically adding production costs.

As an alternative to independent processing of biofuel feed that is composed of glycerides and triglycerides and petroleum-based diesel feed, co-processing the biofuel feed and petroleum-based diesel feed in a hydrotreating unit has become an attractive endeavor. Co-processing promises reduced costs over independent processing of biofuel feed and petroleum-based diesel feed by utilizing the same process streams and equipment that are used for processing the petroleum-based diesel feed alone. In known processes, the biofuel feed and petroleum-based diesel feed are mixed prior to introduction to the hydrotreating unit. However, many biofuel feeds have unsaturated moieties that, when saturated in the presence of hydrogen, release large amounts of heat. If saturation of the unsaturated moieties in the biofuel feed occurs in the first zone of a hydrotreating unit, it may be difficult to control reaction temperatures in the first zone as well as later zones that are downstream of the first zone of the hydrotreating unit. These factors have traditionally limited the amount of biofuel feed that can be co-processed with the petroleum-based diesel feed in hydrotreating units to no greater than 5 weight % based on the total weight of the mixture.

Accordingly, it is desirable to provide a hydrotreating system and method for co-processing biofuel feed and petroleum-based diesel feed that allows for greater amounts of biofuel feed to be co-processed with petroleum-based diesel feed while enabling greater control of reaction temperatures in the various zones of the hydrotreating unit. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Hydrotreating methods and hydrotreating systems are provided herein. In an embodiment, a hydrotreating method includes heating a petroleum-based diesel feed. The heated petroleum-based diesel feed is introduced to a hydrotreating process. An unheated carbonaceous feed is introduced to the hydrotreating process separate from the heated petroleum-based diesel feed. The heated petroleum-based diesel feed and the unheated carbonaceous feed are co-processed in the hydrotreating process.

In another embodiment of a hydrotreating method, a petroleum-based diesel feed is heated in a heating apparatus. The heated petroleum-based diesel feed is introduced to a hydrotreating unit from the heating apparatus. An unheated biofuel feed is introduced to the hydrotreating unit separate from the petroleum-based diesel feed, the unheated biofuel feed comprising a source of fatty acids or derivatives thereof. The heated petroleum-based diesel feed and the unheated biofuel feed is co-processed in the hydrotreating unit.

In an embodiment of a hydrotreating system, the hydrotreating system includes a hydrotreating unit, and a heating apparatus. The hydrotreating system configured for fluid communication with a petroleum-based diesel feed source, and is also configured for fluid communication with an unheated carbonaceous feed source for introducing an unheated carbonaceous feed to the hydrotreating unit separate from the petroleum-based diesel feed. The heating apparatus heats petroleum-based diesel feed from the petroleum based diesel feed source prior to introduction to the hydrotreating unit. The heating apparatus is in fluid communication with the hydrotreating unit for introducing heated petroleum-based diesel feed from the heating apparatus to the hydrotreating unit.

BRIEF DESCRIPTION OF THE DRAWINGS

The present invention will hereinafter be described in conjunction with the following drawing figures, wherein like numerals denote like elements, and wherein:

FIG. 1 is a block diagram of an exemplary embodiment of a hydrotreating system in accordance with an exemplary embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Hydrotreating methods and hydrotreating systems for hydrotreating a petroleum-based diesel feed during production of diesel fuel are provided herein. In particular, the hydrotreating methods and hydrotreating systems enable co-processing of petroleum-based diesel feed that is heated prior to introduction to a hydrotreating process and an unheated carbonaceous feed that is unheated prior to introduction to the hydrotreating process. Numerous challenges of co-processing different feeds that are experienced by conventional hydrotreating methods and systems are addressed with the methods and systems described herein, especially when the unheated carbonaceous feed is a biofuel feed as described in further detail below. As a result, co-processed effluent from the hydrotreating process can be produced by co-processing a higher proportion of biofuel feed relative to petroleum-based diesel feed than was previously possible without experiencing many of the challenges associated therewith.

Referring to FIG. 1, an exemplary hydrotreating system 10 is shown. In accordance with an embodiment, and as shown in the exemplary hydrotreating system 10 of FIG. 1, the hydrotreating system 10 includes a heating apparatus 20, and a hydrotreating unit 22. The hydrotreating system 10 is configured for fluid communication with a petroleum-based diesel feed source 12 and an unheated carbonaceous feed source 36. As known in the art, "petroleum-based diesel feed" refers to a conventional diesel feed that is derived from petroleum-based crude oil, i.e., a non-renewable source, and that contains heteroatoms such as, but not limited to, sulfur and nitrogen. In this embodiment, once introduced to the hydrotreating system 10 from the petroleum-based diesel feed source 12, the petroleum-based diesel feed 14 is mixed with a carrier gas 16, which may be provided from a carrier gas supply 18. However, it is to be appreciated that in other embodiments, the petroleum-based diesel feed 14 may be provided from the petroleum-based diesel feed source 12 pre-mixed with the carrier gas 16. The carrier gas 16 comprises hydrogen that is consumed during hydrotreating and that reacts with the heteroatoms that are present in the petroleum-based diesel feed 14. The hydrogen in the carrier gas 16 may be recovered from a co-processed effluent 17 from the hydrotreating unit 22, to be discussed below, through separation techniques (conducted in a separation zone 46) that are known in the art of diesel fuel production. The hydrogen in the carrier gas 16 may also be provided from a fresh hydrogen feed (not shown) that supplements the recovered hydrogen to account for hydrogen that is consumed during hydrotreating and that is not recovered. Because the carrier gas 16 may include hydrogen that is recovered from the co-processed effluent 17, it is to be appreciated that other components may also be present in the carrier gas 16, such as carbon monoxide and/or carbon dioxide (although most carbon monoxide and carbon dioxide may be removed during recovery of the hydrogen from the co-processed effluent 17).

As alluded to above, the petroleum-based diesel feed 14 is heated. In particular, the petroleum-based diesel feed 14 is heated prior to introduction to a hydrotreating process, which may occur, for example, in the hydrotreating unit 22. In an embodiment, the petroleum-based diesel feed 14 is brought up to a desired inlet temperature for the hydrotreating process. The desired inlet temperature may be influenced by various factors including the age or state of catalyst used in the hydrotreating process, types and amounts of heteroatoms present in the petroleum-based diesel feed 14, and other factors that are known in the art. In accordance with an embodiment, and as shown in the hydrotreating system 10 of FIG. 1, the petroleum-based diesel feed 14 is heated in the heating apparatus 20, which may be a fired heater. More specifically, the heating apparatus 20 heats the petroleum-based diesel feed 14 from the petroleum-based diesel feed source 12 prior to introduction to the hydrotreating unit 22. In this embodiment, the carrier gas 16 is preferably present with the petroleum-based diesel feed 14 during heating in the heating apparatus 20 so that the mixture of the carrier gas 16 and the petroleum-based diesel feed 14 is uniformly heated to the desired inlet temperature for the hydrotreating process.

In an embodiment, the hydrotreating system 10 may also include a heat exchanger 24 upstream of the heating apparatus 20, with the petroleum-based diesel feed 14 passing through the heat exchanger 24 prior to heating in the heating apparatus 20. In this regard, the step of heating the petroleum-based diesel feed 14 may further include the step of passing the petroleum-based diesel feed through the heat exchanger 24. When the heat exchanger 24 is used, co-processed effluent 17 from the hydrotreating unit 22 may be fed through the heat exchanger 24 to heat the petroleum-based diesel feed 14. In an embodiment, as shown in FIG. 1, the carrier gas supply 18 may be in fluid communication with the petroleum-based diesel feed source 12 upstream of the heat exchanger 24. In this embodiment, the carrier gas 16 is present with the petroleum-based diesel feed 14 prior to passing through the heat exchanger 24.

Once heated, the heated petroleum-based diesel feed 26 is introduced to the hydrotreating process. In an embodiment, as shown in FIG. 1, the heated petroleum-based diesel feed 26 is introduced to the hydrotreating unit 22 from the heating apparatus 20. In this embodiment, the heated petroleum-based diesel feed 26 is introduced directly from the heating apparatus 20 to the hydrotreating unit 22. However, it is to be appreciated that in other embodiments, intervening treatment steps may occur between the heating apparatus 20 and the hydrotreating unit 22.

Any hydrotreating process that is known in the art may be employed in the method and system described herein. For purposes of the instant application, "hydrotreating" refers to a process where a feed that contains heteroatoms (e.g., the petroleum-based diesel feed) and a hydrogen-containing gas (e.g., the carrier gas) react in the presence of suitable catalysts for the removal of heteroatoms, such as sulfur and nitrogen, from the feed. In an embodiment, the hydrotreating process may include multiple stages, with different feed, catalysts, or reaction conditions existing within the various stages. In this embodiment, the heated petroleum-based diesel feed is introduced to a first stage, although it is to be appreciated that the heated petroleum-based diesel feed may also be introduced to one or more later stages downstream of the first stage in addition to the first stage. In one embodiment, the heated petroleum-based diesel feed is only introduced to the first stage.

As alluded to above, the exemplary hydrotreating system 10 of FIG. 1 may be used for the hydrotreating method, in which circumstance the hydrotreating process occurs in the hydrotreating unit 22. The hydrotreating unit 22 may contain a single or multiple reactors 23 (such as, for example, trickle-bed reactors) and each reactor 23 may contain one or more zones 28, 30, 32 with each zone including a catalytic bed 34. The stages referred to in the hydrotreating process above may exist in separate reactors (not shown), or may exist in zones within a single reactor 23. For example, in one embodiment, the hydrotreating unit 22 includes a fixed-bed hydrotreating reactor 23. The fixed-bed hydrotreating reactor 23 may include multiple zones 28, 30, 32, with each zone including a catalytic bed. In this embodiment, the first stage in the hydrotreating process may exist in a first zone 28 of fixed-bed hydrotreating reactor 23 and the heated petroleum-based diesel feed 26 is introduced to the first zone 28 of the fixed-bed hydrotreating reactor.

The catalytic beds in the various zones 28, 30, 32 of the fixed-bed hydrotreating reactor 23 may include the same or different hydrotreating catalysts. Suitable hydrotreating catalysts for use herein are any known conventional hydrotreating catalyst and include those that are comprised of at least one Group VIII metal (such as iron, cobalt and/or nickel) and at least one Group VI metal (such as molybdenum and/or tungsten) on a high surface area support material, preferably alumina. Other suitable hydrotreating catalysts include zeolitic catalysts, as well as noble metal catalysts where the noble metal is selected from palladium and platinum. It is within the scope herein that more than one type of hydrotreating catalyst be used in the same reaction vessel. The Group VIII metal may be present in an amount ranging from about 2 to about 20 weight percent, such as from about 4 to about 12 weight percent. The Group VI metal may be present in an amount ranging from about 1 to about 25 weight percent, such as from about 2 to about 25 weight percent. Of course, the particular hydrotreating catalysts and operating conditions may vary depending on the particular hydrocarbons being treated and other parameters, as known in the art.

As alluded to above, the hydrotreating system 10 is also configured for fluid communication with the unheated carbonaceous feed source 36. More specifically, in accordance with the instant methods and systems, an unheated carbonaceous feed 38 is introduced to the hydrotreating process from the unheated carbonaceous feed source 36. The unheated carbonaceous feed 38 comprises a source of hydrocarbons that, together with hydrocarbons in the petroleum-based diesel feed 14, are processed to produce diesel fuel. In an embodiment, the unheated carbonaceous feed 38 is further defined as a biofuel feed that includes a source of fatty acids or derivatives thereof. For example, the biofuel feed may include derivatives of fatty acids such as glycerides, e.g. triglycerides, in addition to or instead of fatty acids. Specific examples of suitable biofuel feeds include, but are not limited to, plant oils such as corn, rapeseed, canola, soybean, and algal oils; animal fats such as inedible tallow; fish oils; and various waste streams such as yellow and brown greases and sewage sludge.

In accordance with the instant methods and systems, the unheated carbonaceous feed 38 is introduced to the hydrotreating process separate from the heated petroleum-based diesel feed 26. More specifically, the unheated carbonaceous feed 38 is kept separate from the heated petroleum-based diesel feed 26, and the unheated carbonaceous feed 38 and heated petroleum-based diesel feed 26 are separately introduced to the hydrotreating process. When the hydrotreating process includes multiple stages, excellent control of reaction temperatures in the various stages can be accomplished by separately introducing the heated petroleum-based diesel feed 26 and the unheated carbonaceous feed 38 to the hydrotreating process. Accordingly, the methods and systems described herein allow for co-processing of greater amounts of biofuel feed with petroleum-based diesel feed.

In accordance with an embodiment, and referring to the exemplary hydrotreating system 10 FIG. 1, once introduced to the hydrotreating system 10 from the unheated carbonaceous feed source 36, the unheated carbonaceous feed 38 is mixed with a quench gas 40 prior to introducing the unheated carbonaceous feed 38 to the hydrotreating process. The quench gas 40 may be provided from a quench gas supply 42.

In this regard, the quench gas supply 42 is in fluid communication with the unheated carbonaceous feed source 36 for mixing the quench gas 40 and the unheated carbonaceous feed 38. However, it is to be appreciated that in other embodiments, the unheated carbonaceous feed 38 may be provided from the unheated carbonaceous feed source 36 pre-mixed with the quench gas 40. In an embodiment, the quench gas 40 and carrier gas 16 are fed from a common gas source (not shown). However, it is to be appreciated that the quench gas 40 and the carrier gas 16 may be fed from different sources. Like the carrier gas 16, the quench gas 40 may include hydrogen that is consumed during hydrotreating and that reacts with the heteroatoms that are present in the petroleum-based diesel feed 14. The main distinction between the quench gas 40 and the carrier gas 16 is not in the composition thereof, but rather is in the type of feed with which the respective gases 16, 40 are mixed. The quench gas 40 serves the further function of enabling temperature control within the hydrotreating process through cooling.

Because the unheated carbonaceous feed 38 is unheated, the unheated carbonaceous feed 38 bypasses any heating steps that the petroleum-based diesel feed undergoes. For example, in the hydrotreating system 10 shown in FIG. 1, the unheated carbonaceous feed 38 bypasses the heating apparatus 20. When the heat exchanger 24 is used, the unheated carbonaceous feed 38 also bypasses the heat exchanger 24. Like the unheated carbonaceous feed 38, the quench gas 40 is also unheated upon introduction to the hydrotreating process.

In an embodiment, when the hydrotreating process includes multiple stages, the unheated carbonaceous feed 38 is fed to at least one later stage that is downstream of the first stage of the hydrotreating process. In a further embodiment, the unheated carbonaceous feed 38 is fed to at least two later stages that are downstream of the first stage of the hydrotreating process. In this embodiment, the unheated carbonaceous feed source 36 may be split, with a corresponding split in the quench gas supply 42 to supply quench gas 40 to the respective branches of the unheated carbonaceous feed source 36. To explain, because the unheated carbonaceous feed 38 may be used to enable temperature control through cooling, feeding the unheated carbonaceous feed 38 to a later stage that is downstream of the first stage of the hydrotreating process enables temperature within the hydrotreating process to be decreased, thereby counteracting temperature increases that occur as a result of reactions in the first or earlier stages of the hydrotreating process. Such temperature control may be useful to maximize efficiency of the hydrotreating process through the life of catalyst beds 34 used in the hydrotreating process. Further, such temperature control may be useful to adjust for different petroleum-based diesel feeds 14 having different amounts of unsaturation, which may affect temperature in the hydrotreating process. Further still, when the unheated carbonaceous feed 38 includes biofuel feeds that include fatty acids or derivatives thereof, the biofuel feeds may have high amounts of unsaturation that, if reacted in the first stage, may cause excessively high temperatures in the first stage that require large quantities of quench gas 40 in later stages that are downstream of the first stage. The presence of the quench gas 40 with the unheated carbonaceous feed 38 also assists with temperature control. Feeding the unheated carbonaceous feed 38 to at least two later stages that are downstream of the first stage of the hydrotreating process enables even greater control of the hydrotreating process.

In one example, as shown in the exemplary hydrotreating system of FIG. 1, the heating apparatus 20 is in fluid communication with the hydrotreating unit for introducing heated petroleum-based diesel feed 26 from the heating apparatus 20 to the hydrotreating unit 22, and the unheated carbonaceous feed source 36 is in fluid communication with the hydrotreating unit 22 for introducing the unheated carbonaceous feed 38 to the hydrotreating unit 22 separate from the petroleum-based diesel feed 14, with the unheated carbonaceous feed 38 bypassing the heating apparatus 20 and the heat exchanger 24. As also shown in FIG. 1., in this embodiment, the unheated carbonaceous feed 38 is fed to a later zone 30 that is downstream of the first zone 28 of the fixed-bed hydrotreating reactor 23. In particular, the unheated carbonaceous feed 38 is shown in FIG. 1 being fed to at least two later zones 30, 32 that are downstream of the first zone 28 of the hydrotreating reactor 23. Temperature controllers 44, 45 are shown that control flow of the quench gas 40 and unheated carbonaceous feed 38 to the later zones 30, 32, and the temperature controllers 44, 45 may be used for controlling temperature within the later zones 30, 32 that are downstream of the first zone 28 of the hydrotreating reactor 23.

After introducing the heated petroleum-based diesel feed 26 and the unheated carbonaceous feed 38 to the hydrotreating process, the heated petroleum-based diesel feed 26 and the unheated carbonaceous feed 38 are co-processed in the hydrotreating process. More specifically, in an embodiment, the heated petroleum-based diesel feed 26 and the unheated carbonaceous feed 38 are co-processed in the presence of hydrogen from the quench gas 40 and carrier gas 16 to produce a co-processed effluent 17. In accordance with the systems and methods described herein, when the unheated carbonaceous feed 38 includes biofuel feed, higher amounts of biofuel feed can be co-processed with the petroleum-based diesel feed than have been practical in the past. For example, biofuel feed may be co-processed with the petroleum-based diesel feed in amounts greater than 5 weight % based on the total weight of the mixture, such as from about 5 to about 15 weight %, or from about 10 to about 15 weight %, based on the total weight of the mixture. Further, because the heated petroleum-based diesel feed 26 and the unheated carbonaceous feed 38 are separately introduced to the hydrotreating process, minimal process modifications are required to implement in systems and methods described herein into existing systems and methods.

The co-processed effluent 17 from the hydrotreating process is then subject to further processing as known in the art to refine the diesel fuel, recapture heat from the co-processed effluent 17, separate contaminants from the co-processed effluent 17, and recover hydrogen gas from the co-processed effluent 17. For example, as alluded to above and as shown in the hydrotreating system 10 of FIG. 1, the co-processed effluent 17 from the hydrotreating unit 22 is fed through the heat exchanger 24 to heat the petroleum-based diesel feed 14. The co-processed effluent 17 may then be introduced to the separation zone 46, where the co-processed effluent 17 may be subject to further treatment in, for example, a hot high pressure separator (not shown), a cold vapor liquid separator (not shown), and a hydrogen sulfide, carbon dioxide, and ammonia separator (not shown). Hydrogen may be recovered and recycled back as part of the quench gas and/or the carrier gas 16.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A hydrotreating method comprising the steps of:
heating a petroleum-based diesel feed;
introducing the heated petroleum-based diesel feed to a hydrotreating process;
mixing a quench gas and an heated carbonaceous feed and introducing the mixture of the quench gas and the unheated carbonaceous feed to the hydrotreating process separate from the heated petroleum-based diesel feed; and
co-processing the heated petroleum-based diesel feed and the unheated carbonaceous feed in the hydrotreating process
wherein the hydrotreating process comprises multiple stages, and wherein the heated petroleum-based diesel feed is introduced to a first stage and the mixture of the quench gas and the unheated carbonaceous feed is fed to a later stage that is downstream of the first stage of the hydrotreating process.

2. The method of claim 1, wherein the unheated carbonaceous feed is further defined as a biofuel feed comprising a source of fatty acids or derivatives thereof.

3. The method of claim 1, wherein the unheated carbonaceous feed is fed to at least two later stages that are downstream of the first stage of the hydrotreating process.

4. The method of claim 1, further comprising the step of controlling temperature within the later stage that is downstream of the first stage of the hydrotreating process through flow of the quench gas and unheated carbonaceous feed mixture to the later stage.

5. A hydrotreating method comprising the steps of:
mixing a carrier gas and a petroleum-based diesel feed
heating the mixture of the carrier gas and the petroleum-based diesel feed;
introducing the heated mixture of the carrier gas and the petroleum-based diesel feed to a hydrotreating process;
introducing an unheated carbonaceous feed to the hydrotreating process separate from the heated petroleum-based diesel feed; and
co-processing the heated petroleum-based diesel feed and the unheated carbonaceous feed in the hydrotreating process.

6. The method of claim 5, further comprising the step of mixing a quench gas and the unheated carbonaceous feed prior to introducing the unheated carbonaceous feed to the hydrotreating process, wherein the quench gas and the carrier gas are provided from a common gas source.

7. The method of claim 5, wherein the unheated carbonaceous feed is further defined as a biofuel feed comprising a source of fatty acids or derivatives thereof.

* * * * *